US009014954B2

(12) United States Patent
Sato

(10) Patent No.: US 9,014,954 B2
(45) Date of Patent: Apr. 21, 2015

(54) TRAFFIC CONTROL SYSTEM, VEHICLE CONTROL SYSTEM, AND TRAFFIC CONTROL METHOD

(75) Inventor: Kunihito Sato, Mishima (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 9 days.

(21) Appl. No.: 13/817,435

(22) PCT Filed: Aug. 11, 2011

(86) PCT No.: PCT/IB2011/001849

§ 371 (c)(1), (2), (4) Date: Feb. 15, 2013

(87) PCT Pub. No.: WO2012/023016

PCT Pub. Date: Feb. 23, 2012

(65) Prior Publication Data

US 2013/0144516 A1 Jun. 6, 2013

(30) Foreign Application Priority Data

Aug. 17, 2010 (JP) ................................ 2010-182319

(51) Int. Cl.
*G06F 19/00* (2011.01)
*G08G 1/00* (2006.01)
(Continued)

(52) U.S. Cl.
CPC ................ *G08G 1/00* (2013.01); *G08G 1/0112* (2013.01); *G08G 1/0116* (2013.01); *G08G 1/0133* (2013.01); *G08G 1/0145* (2013.01); *G08G 1/095* (2013.01); *G08G 1/096716* (2013.01); *G08G 1/096741* (2013.01); *G08G 1/096783* (2013.01); *G08G 1/096791* (2013.01)

(58) Field of Classification Search
CPC .................. B60W 2550/008; B60W 2550/20; G08G 1/22; G08G 1/096078; G08G 1/096725
USPC .......................................................... 701/118
See application file for complete search history.

(56) References Cited

U.S. PATENT DOCUMENTS

2005/0256630 A1* 11/2005 Nishira et al. .................. 701/96
2010/0134320 A1* 6/2010 Chevion et al. ............... 340/932
(Continued)

FOREIGN PATENT DOCUMENTS

DE 10 2008 061303 A1 6/2009
JP 2006-309736 A 11/2001
(Continued)

OTHER PUBLICATIONS

Caveney, Derek, "Cooperative Vehicular Safety Applications," IEEE Control Systems Magazine, IEEE Service Center, Piscataway, NJ, vol. 30, No. 4, Aug. 1, 2010, pp. 38-53 (XP011313171).
(Continued)

*Primary Examiner* — James Trammell
*Assistant Examiner* — Michael D Lang
(74) *Attorney, Agent, or Firm* — Kenyon & Kenyon LLP

(57) ABSTRACT

A traffic control system provides a driver of a vehicle, which runs in a predetermined running state among vehicles running on a road with information on the suppression of traffic congestion on the road. The predetermined running state is, for example, a running state constituting a cause of traffic congestion on the road. The information may be provided by urging the driver to perform a driving operation of at least one of acceleration and lane change.

14 Claims, 6 Drawing Sheets

(51) Int. Cl.
*G08G 1/01* (2006.01)
*G08G 1/0967* (2006.01)
*G08G 1/095* (2006.01)

(56) References Cited

U.S. PATENT DOCUMENTS

| | | | | |
|---|---|---|---|---|
| 2011/0022247 | A1 | 1/2011 | Stahlin et al. | |
| 2011/0190972 | A1 * | 8/2011 | Timmons et al. | 701/29 |

FOREIGN PATENT DOCUMENTS

| | | | |
|---|---|---|---|
| JP | 2005-300184 | A | 10/2005 |
| JP | 2006-293727 | A | 10/2006 |
| JP | 2006-300771 | A | 11/2006 |
| JP | 2008-269170 | A | 11/2008 |

OTHER PUBLICATIONS

Boukerche, A. et al., "Vehicular Ad Hoc Networks: A New Challenge for Localization-Based Systems," Computer Communications, Elsevier Science Publishers BV, Amsterdam, NL, vol. 31, No. 12, Jul. 30, 2008, pp.

Papegeortiu, Markos, Concise Encyclopedia of Traffic & Transportation Systems, Dec. 12, 1999, Elsevier Science Ltd., The Netherlands, pp. 61-64 (XP002662718).

* cited by examiner

TRAFFIC CONTROL SYSTEM, VEHICLE CONTROL SYSTEM, AND TRAFFIC CONTROL METHOD

CROSS-REFERENCE TO RELATED APPLICATIONS

This application is a United States National Stage Patent Application filed under 35 U.S.C. §371, based on International Application Ser. No. PCT/JP2011/001849, which was filed on Aug. 11, 2011, which claims priority to Japanese Patent Application No. 2010-182319, filed on Aug. 17, 2010, the entire contents of each of which are expressly incorporated herein by reference.

BACKGROUND OF THE INVENTION

1. Field of the Invention

The invention relates to a traffic control system, a vehicle control system, and a traffic control method.

2. Description of Related Art

Conventionally, there have been proposed arts of providing guidance in accordance with the occurrence of traffic congestion. Japanese Patent Application Publication No. 2006-300771 (JP-A-2006-300771) discloses an art of a traffic congestion guidance method and an on-vehicle device which make it possible to provide guidance in accordance with the cause of traffic congestion.

The possibilities of suppressing the occurrence of traffic congestion and relieving traffic congestion have been desired.

SUMMARY OF THE INVENTION

The invention provides a traffic control system, a vehicle control system, and a traffic control method which make at least one of the suppression of the occurrence of traffic congestion and the relief of traffic congestion possible.

A traffic control system according to a first aspect of the invention provides a driver of a vehicle, which runs in a predetermined running state among vehicles running on a road, with information on suppression of traffic congestion on the road.

In the aforementioned traffic control system, the predetermined running state may be a running state constituting a cause of traffic congestion on the road.

In the aforementioned traffic control system, the predetermined running state may be running at a head of a vehicle group, and the information may be provided by providing a driver of a leading vehicle running at the head of the vehicle group with information on at least one of formation of the vehicle group with the leading vehicle at the head and a driving operation of suppressing a growth of the vehicle group.

The aforementioned traffic control system may provide the driver with the information on a basis of at least one of a running speed of the leading vehicle, a vehicle-to-vehicle value between the leading vehicle and a vehicle running immediately in front of the leading vehicle, and a number of vehicles included in the vehicle group.

The aforementioned traffic control system may urge the driver of the leading vehicle to perform a driving operation of at least one of acceleration and lane change in providing the driver with the information.

The aforementioned traffic control system may more strongly urge the driver of the leading vehicle to perform the driving operation when the running speed of the leading vehicle is low than when the running speed of the leading vehicle is high.

The aforementioned traffic control system may more strongly urge the driver of the leading vehicle to perform the driving operation when the vehicle-to-vehicle value between the leading vehicle and the vehicle running immediately in front of the leading vehicle is large than when the vehicle-to-vehicle value between the leading vehicle and the vehicle running immediately in front of the leading vehicle is small.

The aforementioned traffic control system may more strongly urge the driver of the leading vehicle to perform the driving operation when the number of the vehicles included in the vehicle group is large than when the number of the vehicles included in the vehicle group is small.

A mode may be employed, in which the driver is urged strongly to perform the driving operation in a manner selected from the following modes as long as the safety of the vehicle is secured. In the case where the driver is urged to perform the driving operation by sound (acoustic information) from a speaker in the vehicle, a mode may be employed, in which the volume of the sound is raised. In the case where the driver is urged to perform the driving operation by graphic information, literal information, etc. that are displayed on a display device, a mode may be employed, in which the brightness of the display device is increased. A mode may be employed, in which the number of times the driver is urged to perform the driving operation is increased. A mode may be employed, in which a reactive force, such as a driving-wheel reactive force or a pedal reactive force, is increased to urge the driver to perform the driving operation.

In the aforementioned traffic control system, the predetermined running state may be running at a speed lower than a predetermined speed set in advance, and the information may be provided by providing a driver of a predetermined vehicle running at the speed lower than the predetermined speed with information on at least one of predictable formation of a vehicle group with the predetermined vehicle at a head and a driving operation of restraining the vehicle group from being formed with the predetermined vehicle at the head.

The aforementioned traffic control system may provide the driver with the information in at least one of a range of a running environment tending to cause a fall in running speed on the road and a range before the range of the running environment.

A vehicle control system according to a second aspect of the invention performs running control of a vehicle to suppress a growth of a vehicle group when the vehicle runs at a head of the vehicle group.

A traffic control method according to a third aspect of the invention includes detecting a vehicle running in a predetermined running state among vehicles running on a road, and providing a driver of the detected vehicle running in the predetermined running state with information on suppression of traffic congestion on the road.

The traffic control system, the vehicle control system, and the traffic control method according to the invention provide a driver of a vehicle, which runs in a predetermined running state among vehicles running on a road, with information on the suppression of traffic congestion on the road. The traffic control system, the vehicle control system, and the traffic control method according to the invention selectively provide the driver of the vehicle running in the predetermined running state with the information on the suppression of traffic congestion, and thus achieve an effect of making at least one of the suppression of the occurrence of traffic congestion and the relief of traffic congestion possible.

BRIEF DESCRIPTION OF THE DRAWINGS

Features, advantages, and technical and industrial significance of example embodiments of the invention will be described below with reference to the accompanying drawings, in which like numerals denote like elements, and wherein.

DETAILED DESCRIPTION OF EMBODIMENTS

A traffic control system and a vehicle control system according to each of the embodiments of the invention will be described hereinafter in detail with reference to the drawings. It should be noted that the invention is not limited by these embodiments thereof. Further, the components in the following embodiments of the invention include those which are substantially identical thereto or those which are easily conceivable by those skilled in the art.

Figure 1:
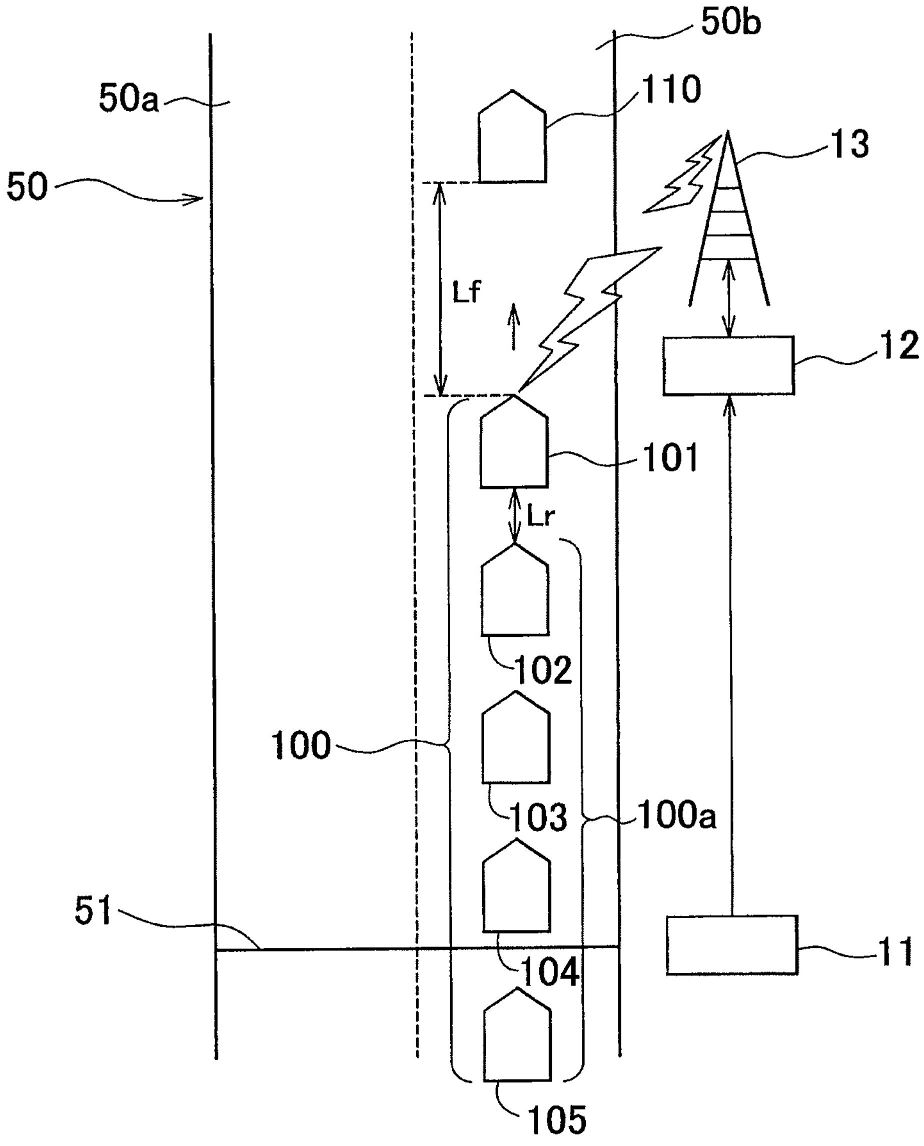
FIG. 1 is a view showing traffic control according to the first embodiment of the invention.

The first embodiment of the invention will be described with reference to FIGS. 1 and 2. This embodiment of the invention relates to a traffic control system. FIG. 1 is a view showing traffic control according to this embodiment of the invention, and FIG. 2 is a view showing a traffic control system of this embodiment of the invention.

A traffic control system 1 of this embodiment of the invention provides a driver of a vehicle, which runs in a predetermined running state among vehicles running on a road, with information on the suppression of traffic congestion on the road. The predetermined running state indicates, for example, a running state constituting a cause of traffic congestion on the road. In this embodiment of the invention, a case where the predetermined running state is defined as running at the head of a vehicle group will be described. More specifically, the traffic control system 1 provides a driver of a leading vehicle running at the head of a vehicle group with information on at least one of the formation of the vehicle group with the leading vehicle at the head and a driving operation of suppressing a growth of the vehicle group. Thus, the driver of the leading vehicle can be made aware that his or her own vehicle blocks the flow of vehicles, and can be urged to perform the driving operation of suppressing the growth of the vehicle group. When the growth of the vehicle group is suppressed or the vehicle group is eliminated through the driving operation performed by the driver, at least one of the suppression of the occurrence of traffic congestion and the relief of traffic congestion is thereby made possible.

It should be noted that the predetermined running state is not limited to running at the head of the vehicle group. The predetermined running state can be determined on the basis of a state of the own vehicle such as a running speed, an acceleration or the like of the vehicle, a state on a relationship to other vehicles such as a vehicle-to-vehicle distance, a vehicle-to-vehicle time interval, a relative speed or the like, a state on a relationship to the vehicle group such as a position in the vehicle group, a positional relationship to an oncoming vehicle group or the like, or the like. It is preferable that the predetermined running state be determined as a running state constituting a cause of traffic congestion on the road. It should be noted that the running state constituting a cause of traffic congestion indicates, for example, a running state tending to constitute a cause of the occurrence of traffic congestion or a running state tending to promote ongoing traffic congestion.

Figure 2:
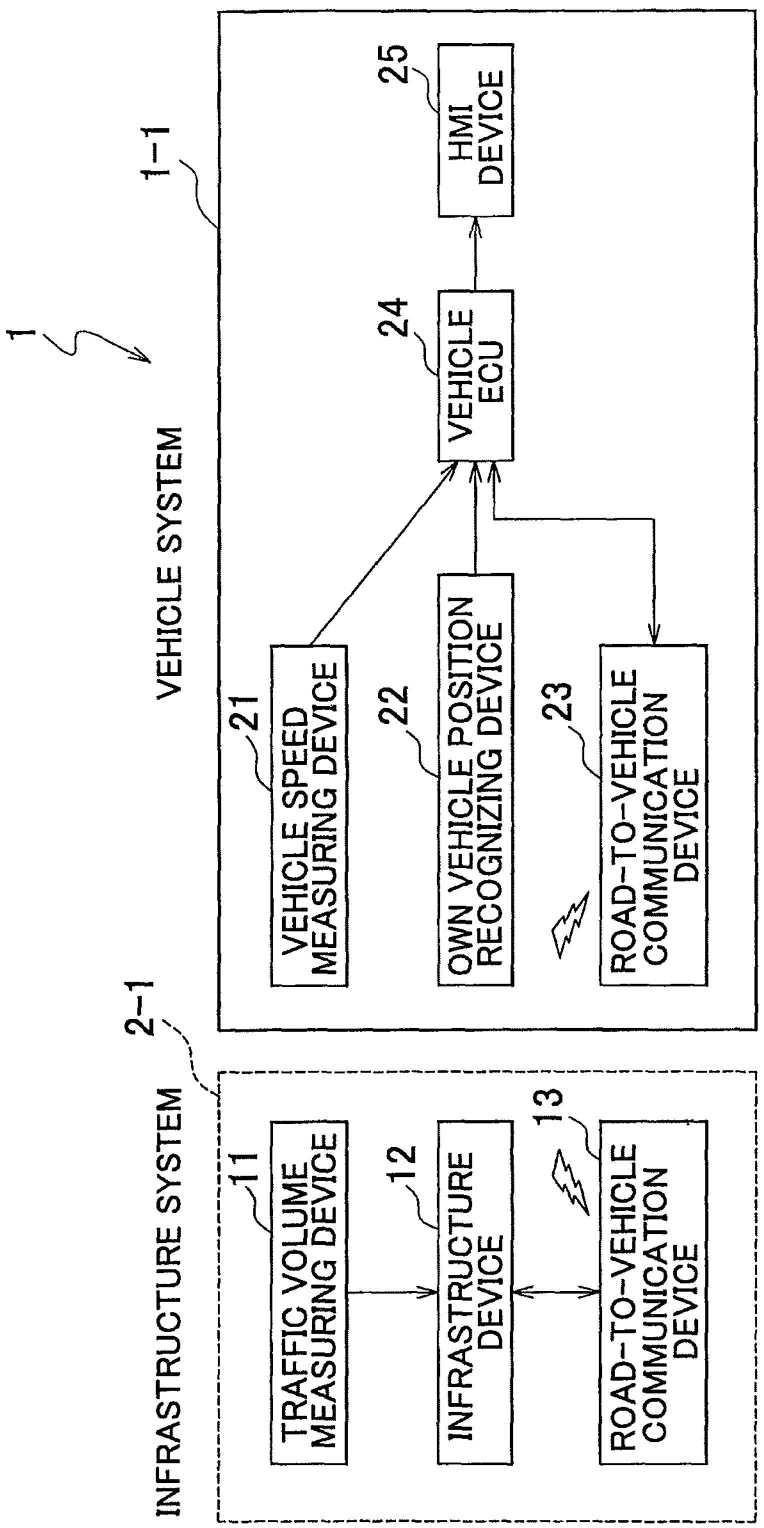
FIG. 2 is a view showing a traffic control system of the first embodiment of the invention.

As shown in FIG. 2, the traffic control system 1 is equipped with a vehicle system 1-1 and an infrastructure system 2-1. The vehicle system 1-1 has a vehicle speed measuring device 21, an own vehicle position recognizing device 22, a road-to-vehicle communication device 23, a vehicle ECU 24, and a human machine interface (HMI) device 25.

The vehicle speed measuring device 21 can measure a running speed of the own vehicle. The vehicle speed measuring device 21 measures a running speed of the vehicle on the basis of wheel speeds. The own vehicle position recognizing device 22 recognizes a position of the own vehicle. The own vehicle position recognizing device 22 can be designed as, for example, a navigation system having a GPS device and map data. The GPS device has a GPS receiver, a geomagnetic sensor, a distance sensor, a beacon sensor, a gyro sensor, and the like. The own vehicle position recognizing device 22 acquires a position and a bearing (a traveling direction) of the own vehicle from the GPS device.

The map data include pieces of information on roads (coordinates, straight roads, gradients, curves, expressways, numbers of lanes, tunnels, sags, and the like). The own vehicle position recognizing device 22 can acquire from the map data pieces of information on a road on which the own vehicle runs, on the basis of the position of the own vehicle acquired from the GPS device. The own vehicle position recognizing device 22 acquires from the map data, for example, a piece of information on a current position of the road on which the own vehicle runs, and a piece of information on a range in front of the own vehicle. The road-to-vehicle communication device 23 responds to a road-to-vehicle communication device 13 of the infrastructure system 2-1. The road-to-vehicle communication device 23 is a communication device that establishes bidirectional communication between the vehicle system 1-1 and the infrastructure system 2-1.

The vehicle ECU 24 is an electronic control unit. The vehicle ECU 24 is connected to the vehicle speed measuring device 21, the own vehicle position recognizing device 22, and the road-to-vehicle communication device 23. A signal indicating a running speed measured by the vehicle speed measuring device 21 is output to the vehicle ECU 24. Further, a signal indicating a position and a bearing of the own vehicle recognized by the own vehicle position recognizing device 22, and the pieces of information on the road acquired from the map data are output to the vehicle ECU 24. The vehicle ECU 24 exchanges information with the infrastructure system 2-1 via the road-to-vehicle communication device 23.

In road-to-vehicle communication, the vehicle ECU 24 transmits identification information, running information, communication standard information, and the like. The identification information includes an ID of a transmission source vehicle and an ID of a vehicle group to which the transmission source vehicle belongs. The running information is composed of pieces of information on measurement values about the running of the own vehicle, such as a current position, a traveling direction (a bearing), a running speed, a running acceleration, a jerk, a vehicle-to-vehicle distance, a vehicle-to-vehicle time interval, and the like. The communication standard information is based on a predetermined rule, and includes flags indicating greeting information and transfer information, and the like.

The HMI device 25 is a device that, for example, provides a driver with information. The HMI device 25 is an on-vehicle instrument, and has, for example, a display device, a speaker, and the like, which are provided in a passenger compartment. An existing device, for example, a display device, a speaker or the like of a navigation system may be diverted to serve as the HMI device 25. The HMI device 25 has the function of providing the driver with information on the basis of the information transmitted from the infrastructure system 2-1. That is, the traffic control system 1 of this embodiment of the invention provides the driver with pieces of information on the suppression of traffic congestion on roads via the HMI device 25. The HMI device 25 provides information in the form of acoustic information, graphic information, literal information and the like.

The infrastructure system 2-1 is a system installed on a road side as a traffic base. The infrastructure system 2-1 is arranged, for example, on a road or beside a road. The infrastructure system 2-1 has a traffic volume measuring device 11, an infrastructure device 12, and the road-to-vehicle communication device 13. The traffic volume measuring device 11 can measure a traffic volume of vehicles running on a road. As shown in FIG. 1, the traffic volume measuring device 11 measures a traffic volume at a measurement spot 51 on a road 50. The traffic volume measuring device 11 can measure a number of vehicles passing the measurement spot 51 per hour, passing speeds thereof, and vehicle-to-vehicle time intervals thereof. The traffic volume measuring device 11 measures a traffic volume on each of lanes. Signals indicating the traffic volume (the number/hour·lane), passing speeds and vehicle-to-vehicle time intervals, which are measured by the traffic volume measuring device 11, are output to the infrastructure device 12.

In FIG. 1, the road 50 is a four-lane expressway having a cruising lane 50*a* and an overtaking lane 50*b* on each side. The traffic volume measuring device 11 measures a traffic volume, passing speeds, and vehicle-to-vehicle time intervals on each of the cruising lane 50*a* and the overtaking lane 50*b*. The infrastructure device 12 can acquire traffic volumes, passing speeds, and vehicle-to-vehicle time intervals on each of the lanes and on the road 50 as a whole, on the basis of the information output from the traffic volume measuring device 11. The following description will handle a case where the traffic control system 1 performs traffic control on an expressway, but the invention is not limited to this case. The traffic control system 1 may be applied to a general road other than an automobile road such as an expressway or the like.

The infrastructure device 12 determines a vehicle group 100 passing the measurement spot 51 and a vehicle running at the head of the vehicle group, on the basis of the information sent from the traffic volume measuring device 11. The infrastructure device 12 determines the vehicle group 100 on the basis of, for example, the vehicle-to-vehicle time intervals measured by the traffic volume measuring device 11. For example, when the vehicle-to-vehicle time interval between a vehicle 101 and another vehicle 102 running immediately behind the vehicle 101 is shorter than a predetermined vehicle-to-vehicle time interval set in advance, it is possible to determine that the vehicle 101 and the vehicle 102 constitute the same vehicle group 100. By the same token, when a vehicle-to-vehicle time interval between the vehicle 102 and another vehicle 103, a vehicle-to-vehicle time interval between the vehicle 103 and another vehicle 104, and a vehicle-to-vehicle time interval between the vehicle 104 and another vehicle 105 are shorter than the predetermined vehicle-to-vehicle time interval respectively, the infrastructure device 12 can determine that the vehicles 103, 104, and 105 constitute the same vehicle group 100 as the vehicles 101 and 102. That is, the infrastructure device 12 recognizes a group of vehicles successively running in a longitudinal direction at a vehicle-to-vehicle time interval shorter than the predetermined vehicle-to-vehicle time interval, as the vehicle group 100.

Further, the infrastructure device 12 determines the vehicle running at the head of the vehicle group 100. For example, when the vehicle-to-vehicle time interval between the vehicle 101 and another vehicle 110 running immediately in front of the vehicle 101 is equal to or longer than the predetermined vehicle-to-vehicle time interval, the infrastructure device 12 determines that the vehicle 110 does not constitute the same vehicle group 100 as the vehicle 101. In this case, the infrastructure device 12 determines that the vehicle 101 is the vehicle running at the head of the vehicle group 100. In the following description, the vehicle 101 running at the head of the vehicle group 100 will be referred to also as "the leading vehicle 101". Further, the vehicles 102, 103, 104, and 105, which constitute the same vehicle group 100 as the leading vehicle 101 and run behind the leading vehicle 101, will be comprehensively referred to also as "following vehicles 100*a*".

Upon recognizing the vehicle group 100, the infrastructure device 12 provides the driver of the leading vehicle 101 of the vehicle group 100 with information. This provision of information relates to at least one of the formation of the vehicle group 100 with the vehicle 101 at the head and a driving operation of suppressing a growth of the vehicle group 100. The vehicle group 100 may induce traffic congestion. For example, when the vehicle group 100 is created, the vehicle-to-vehicle distances among the respective vehicles 101, 102, 103, 104, and 105 included in the vehicle group 100 are likely to become short. When the vehicles in the vehicle group 100 decelerate with the vehicle-to-vehicle distances being short, a deceleration shock wave is likely to occur. For example, when the leading vehicle 101 decelerates, deceleration is propagated to the following vehicles 100*a* one after another in the fore-to-aft direction. In this case, when the vehicle-to-vehicle distances are short, a deceleration shock wave causing the propagation of deceleration to the following vehicles 100*a* one after another in the fore-to-aft direction with increases in the fall in speed may occur. If the created vehicle group 100 can be eliminated or the growth of the vehicle group 100 can be suppressed, the occurrence of traffic congestion on roads can be suppressed by, for example, suppressing the occurrence of traffic congestion resulting from a deceleration shock wave or the like, relieving traffic congestion, or the like.

The traffic control system 1 of this embodiment of the invention attempts to eliminate the vehicle group 100 or suppress the growth of the vehicle group 100 by providing the driver of the leading vehicle 101, which runs at the head of the vehicle group 100, with information. It should be noted herein that the growth of the vehicle group 100 means the increase in the number of vehicles included in the vehicle group 100, which is caused, for example, when another vehicle that has caught up with the vehicle group 100 from behind is added as a new vehicle constituting the vehicle group 100. Further, the elimination of the vehicle group 100 indicates that at least one or some of the vehicle-to-vehicle time intervals of the respective vehicles included in the vehicle group 100 increase to become equal to or longer than a predetermined vehicle-to-vehicle time interval. That is, the elimination of the vehicle group 100 also includes the separation of the vehicle group 100 into a plurality of vehicle groups. For example, the elimination of the vehicle group 100 also includes that an increase in the vehicle-to-vehicle time interval between the leading vehicle 101 and the vehicle 102 immediately behind the vehicle 101 leads to a determination that the leading vehicle 101 and the following vehicles 100*a* are not included in the same vehicle group.

The infrastructure device 12 transmits to the leading vehicle 101 the information with which the driver is to be provided, through road-to-vehicle communication. It should be noted that the leading vehicle 101 can be identified in road-to-vehicle communication on the basis of a time when the passage of the leading vehicle of the vehicle group 100 is measured by the traffic volume measuring device 11 and a time when the vehicle 101 passes the measurement spot 51, which is acquired through road-to-vehicle communication.

The driver of the leading vehicle 101 may be provided with information by simply being notified of a situation to be made aware that the own vehicle runs at the head of the vehicle group 100, being urged to perform the driving operation of suppressing the growth of the vehicle group 100, or being urged to perform the driving operation in addition to being notified of a situation. For example, when the driver is provided with information by being notified of the situation, it is appropriate to notify the driver not only the fact that the leading vehicle 101 runs at the head of the vehicle group 100 but also the number of vehicles following the leading vehicle 101 from behind or the fact that the vehicle group 100 grows, or the like. It should be noted that it can be detected whether or not the vehicle group 100 grows, by measuring the traffic volume by the traffic volume measuring device 11 at positions on the road 50 with different traveling directions.

Further, when the driver is provided with information by being notified of the driving operation, it is appropriate to provide information for urging the driver to perform an operation of at least one of acceleration and lane change. In providing information for urging the driver to accelerate, the driver is urged to run at a higher vehicle speed than a current speed. For example, it is possible to inform the driver of a segmental average speed of a lane on which the leading vehicle 101 runs, and urge the driver to run at a speed equal to or higher than this segmental average speed. When the infrastructure device 12 has acquired a target speed of the following vehicles 100*a*, the driver may be urged to run at a speed equal to or higher than this target speed. For example, when at least one of the following vehicles 100*a* is subjected to cruise control, it is appropriate to acquire a target speed of the cruise control through road-to-vehicle communication, and notify the driver of the leading vehicle 101 of the target speed.

In providing information for urging the driver to change lanes, the driver is urged to change from a current lane to another lane. For example, when the leading vehicle 101 runs on the overtaking lane 50*b*, the driver is urged to change to the cruising lane 50*a*.

It should be noted that the infrastructure device 12 may change the contents of the driving operation the driver is urged to perform, on the basis of the traffic volume on each of the lanes. For example, in the case where the vehicle group 100 is on the overtaking lane 50*b*, the leading vehicle 101 may be urged to change to the cruising lane 50*a* when the traffic volume on the cruising lane 50*a* is smaller than the traffic volume on the overtaking lane 50*b*, and the leading vehicle 101 may be urged to accelerate when the traffic volume on the cruising lane 50*a* is larger than the traffic volume on the overtaking lane 50*b*. In this case, the growth of the vehicle group 100 can be suppressed while restraining vehicles from concentrating on one of the lanes.

When the driver of the leading vehicle 101, who is provided with information, performs the operation of lane change or acceleration, the growth of the vehicle group 100 is thereby suppressed. For example, when the lane of the leading vehicle 101 is changed, the previous restriction on the speed by the running speed of the leading vehicle 101 is eliminated. Thus, the running speed of the vehicle group 100 increases to restrain a new vehicle from joining the vehicle group 100. Further, when the running speed of the vehicle group 100 increases, the elimination of the vehicle group 100 is brought about through the separation of the vehicle group 100 into a plurality of vehicle groups.

Further, when the driver of the leading vehicle 101 performs the operation of acceleration, the running speed of the vehicle group 100 increases. Thus, the growth of the vehicle group 100 is suppressed, or the vehicle group 100 is eliminated. The driving operation of the driver of the leading vehicle 101, who is thus provided with information, serves to eliminate the vehicle group 100 or suppress the growth of the vehicle group 100. Thus, the propagation of deceleration resulting from the vehicle group 100 or the occurrence of a deceleration shock wave is suppressed. As a result, the occurrence of traffic congestion is suppressed, or traffic congestion is relieved. It should be noted that the operation of acceleration includes not only the operation of an accelerator but also the driver's operation of commanding the vehicle to accelerate, for example, changing the target speed to a high speed side in cruise control such as adaptive cruise control (ACC) or the like. It should be noted herein that ACC is designed as follow-up control for detecting a preceding vehicle by, for example, a radar or the like and performing follow-up running to maintain a certain vehicle-to-vehicle distance in accordance with the preceding vehicle, and as constant-speed running control for causing the vehicle to run such that the vehicle speed of the vehicle becomes constant.

It is preferable that the traffic control system 1 provide the driver of the leading vehicle 101 with information in a running environment tending to cause a fall in running speed on the road 50, namely, in at least one of a range of a running environment tending to cause a fall in speed and a range before the range of the running environment. The running environment tending to cause a fall in speed is, for example, a sag, a tunnel, merging, or the like. In the sag, a fall in running speed tends to be caused in running on an uphill spot after having passed a downhill spot. Further, in front of the tunnel, in the tunnel, or at a merging spot, a fall in speed tends to be caused. It should be noted herein that the merging includes not only a case where a merging road merges with a main road, but also a case where the number of lanes on the main road decreases, and the like. That is, the merging indicates a road shape leading to an increase in traffic volume without causing a change in the traffic capacity of a road or leading to a decrease in traffic capacity without causing a change in traffic volume before and after merging.

In the range before the running environment tending to cause a fall in speed, the driver of the leading vehicle 101 of the vehicle group 100 is provided with information, and the vehicles on the road 50 are thereby restrained from reaching the running environment while forming the vehicle group 100. In the case where the respective vehicles run dispersedly on the road 50 instead of remaining the vehicle group 100, even when at least one of the vehicles decelerates in a sag, in a tunnel, at a merging spot, or the like, the deceleration is restrained from being propagated to the following vehicles. That is, the traffic control system 1 of this embodiment of the invention makes it possible to suppress the occurrence of traffic congestion beforehand or relieve traffic congestion.

It should be noted that although the vehicle group 100 and the leading vehicle 101 of the vehicle group 100 are determined on the basis of the measurement result of the traffic volume measuring device 11 in this embodiment of the invention, the invention is not limited to this case. For example, the infrastructure device 12 can determine the vehicle group 100 and the leading vehicle 101 on the basis of image data obtained by capturing vehicles on the road 50 with a camera or the like. Further, a probe car may provide the infrastructure device 12 with information on the vehicle group 100 and the leading vehicle 101.

Further, the infrastructure device 12 may provide information on the basis of a degree to which the leading vehicle 101 blocks the flow of vehicles as a bottleneck, that is, the degree of sureness of a bottleneck. The blocking of the flow of vehicles means, for example, that the following vehicles 100*a* are forced to run at a speed lower than a desired speed. The vehicle group tends to grow and the vehicle-to-vehicle values tend to decrease as the degree of blocking the flow of vehicles rises. The infrastructure device 12 may provide the driver of the leading vehicle 101 with information when the degree of blocking the flow of vehicles is high.

The degree of blocking the flow of vehicles is considered to be associated with the running speed of the leading vehicle 101. For example, when the running speed of the leading vehicle 101 is lower than the average running speed on a lane, a vehicle group tends to be formed. Also, the degree of blocking the flow of vehicles increases as the difference between the average running speed and the running speed of the leading vehicle 101 increases. Further, when the running speed of the leading vehicle 101 is lower than a running speed desired by the drivers of the following vehicles 100*a*, a vehicle group tends to be formed. Also, the degree of blocking the flow of vehicles increases as the difference between the desired speed of the following vehicles 100*a* and the running speed of the leading vehicle 101 increases. The running speed desired by the drivers of the following vehicles 100*a* is a target speed set by the driver in, for example, cruise control such as ACC or the like. The infrastructure device 12 may provide the driver of the leading vehicle 101 with information when the running speed of the leading vehicle 101 is lower than the average running speed or the target speed and the difference between the running speed of the leading vehicle 101 and the average running speed or the target speed is equal to or larger than a predetermined value. Thus, a driver of a vehicle tending to cause traffic congestion as a bottleneck can be selectively provided with information.

The degree of blocking the flow of vehicles is considered to be associated with changes in the running speed of the leading vehicle 101. For example, when the running speed of the leading vehicle 101 tends to fall, the degree of blocking the flow of vehicles is higher than when the running speed is constant or tends to rise. The infrastructure device 12 may provide the driver of the leading vehicle 101 with information when the running speed of the leading vehicle 101 tends to fall. Further, the infrastructure device 12 may provide the driver of the leading vehicle 101 with information when the deceleration of the leading vehicle 101 is equal to or larger than a certain value.

The degree of blocking the flow of vehicles can also be estimated from the vehicle-to-vehicle value between the leading vehicle 101 and the vehicle 110 running immediately in front of the leading vehicle 101. The vehicle-to-vehicle value is a value concerning a relationship between the leading vehicle 101 and the vehicle 110 running immediately in front of the leading vehicle 101, for example, a vehicle-to-vehicle distance, a vehicle-to-vehicle time interval or the like. For example, the magnitude of a vehicle-to-vehicle distance Lf (see FIG. 1) between the leading vehicle 101 and the vehicle 110 running immediately in front of the leading vehicle 101 and changes in the vehicle-to-vehicle distance Lf are considered to correspond to the degree of blocking the flow of vehicles. The infrastructure device 12 may provide the driver of the leading vehicle 101 with information when the vehicle-to-vehicle distance Lf is equal to or longer than a predetermined vehicle-to-vehicle distance or when the vehicle-to-vehicle distance Lf tends to increase. The predetermined vehicle-to-vehicle distance can be determined on the basis of, for example, the average of vehicle-to-vehicle time intervals measured by the traffic volume measuring device 11. It should be noted that it may be determined, not on the basis of the vehicle-to-vehicle distance but on the basis of the vehicle-to-vehicle time interval, whether to provide information or not.

The degree of blocking the flow of vehicles is considered to be reflected by the number of vehicles included in the vehicle group 100. The infrastructure device 12 may provide the driver of the leading vehicle 101 with information when the number of vehicles included in the vehicle group 100 is equal to or larger than a predetermined number.

The degree of blocking the flow of vehicles is considered to be reflected by the vehicle-to-vehicle value of the vehicles included in the vehicle group 100. The infrastructure device 12 may provide the driver of the leading vehicle 101 with information when the vehicle-to-vehicle value among the respective vehicles in the vehicle group 100, for example, the average vehicle-to-vehicle value is equal to or smaller than a predetermined vehicle-to-vehicle value.

The infrastructure device 12 can determine the degree of blocking the flow of vehicles on the basis of at least one of the running speed of the leading vehicle 101, changes in the running speed of the leading vehicle 101, the vehicle-to-vehicle value between the leading vehicle 101 and the vehicle 110 running immediately in front of the leading vehicle 101, the number of vehicles included in the vehicle group 100, and the vehicle-to-vehicle value among the respective vehicles in the vehicle group 100. In the case where the degree of blocking the flow of vehicles is determined on the basis of a plurality of parameters, the respective parameters may be weighted.

Further, the contents of the provision of information may be changed in accordance with the degree to which the leading vehicle 101 blocks the flow of vehicles. For example, the driver of the leading vehicle 101 may be more strongly urged to perform the driving operation such as acceleration, lane change or the like when the degree of blocking the flow of vehicles is high than when the degree of blocking the flow of vehicles is low.

It should be noted that the infrastructure device 12 may repeatedly provide information when the driver of the leading vehicle 101, who is provided with information, does not perform the driving operation of acceleration or lane change or when the leading vehicle 101 continues to run at the head of the vehicle group 100 even after the provision of information. This repeated provision of information may be carried out only when the degree to which the leading vehicle 101 blocks the flow of vehicles is high.

In this embodiment of the invention, the driver is provided with information such as acoustic information, graphic information, literal information, or the like. However, this does not limit the method of providing information. For example, the driver may be provided with information via an operation member operated by the driver. For example, the driver's attention may be attracted by giving a torque to a steering wheel through an actuator to cause the steering wheel to slightly vibrate or by giving a pedal reactive force to a pedal.

A device that provides the driver with information is not limited to a device in a passenger compartment. For example, a display device installed on a road side may selectively provide the driver of the leading vehicle 101 with information. When the leading vehicle 101 runs at a position where the display device is visually easily recognizable, the display device may be caused to display information promoting the operation of suppressing the growth of the vehicle group.

The contents of the information with which the driver is provided is not limited to those exemplified in this embodiment of the invention. For example, the driver of the leading vehicle 101 may be simply provided with information on the target speed in ACC of the following vehicles 100*a* or the segmental average speed on the road 50. Through the provision of information on these speeds alone, the driver of the leading vehicle 101, which runs at a low speed, can be made aware that the own vehicle is a bottleneck.

In the foregoing first embodiment of the invention, furthermore, it may be determined in accordance with the traffic volume on the road 50 whether to provide the driver of the leading vehicle 101 with information or not. For example, the provision of information may be carried out when at least one of a condition that the traffic volume on the road 50 be equal to or larger than a certain value and a condition that the traffic volume on the road 50 tend to increase is fulfilled.

Figure 3:
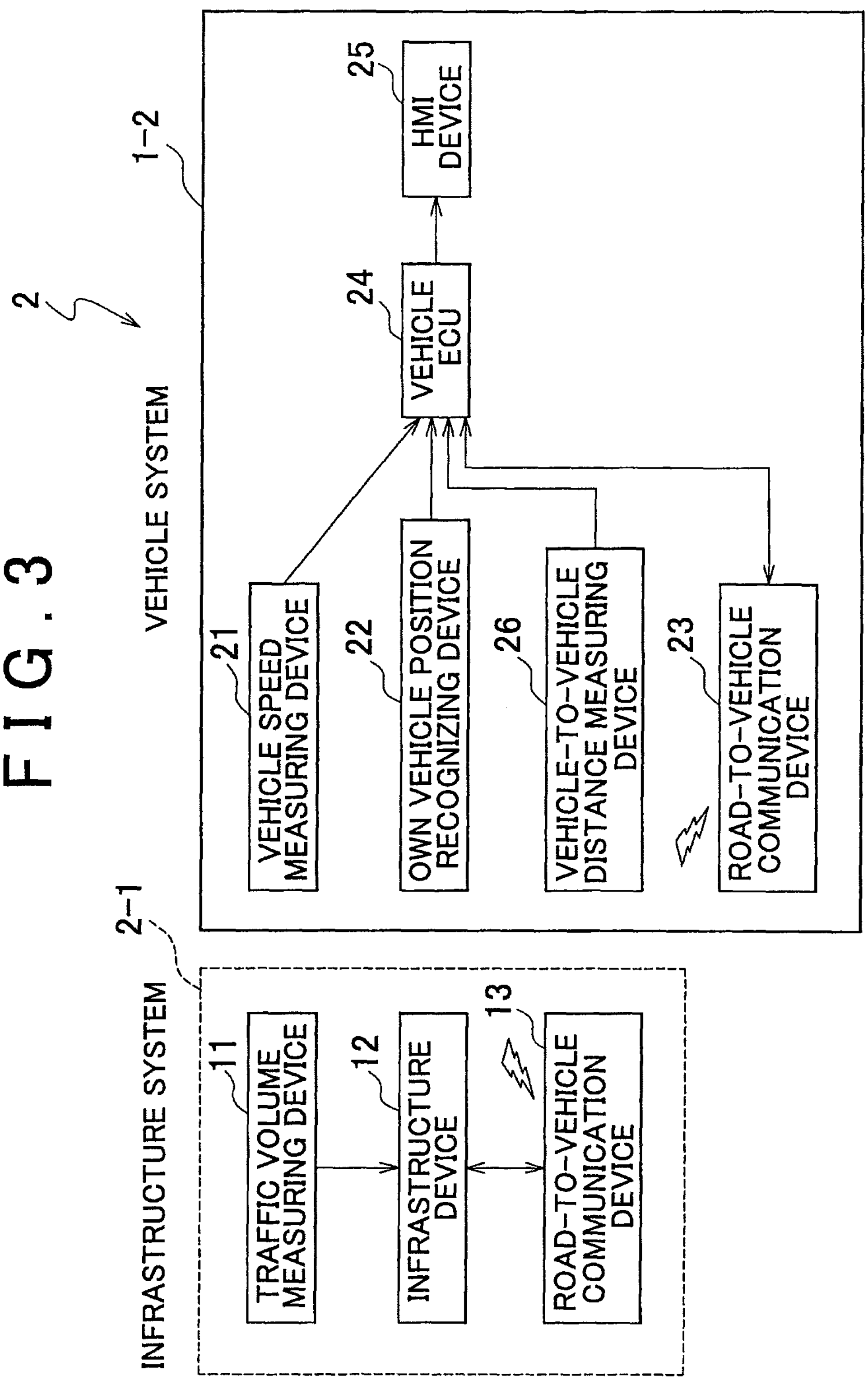
FIG. 3 is a view showing a traffic control system of the second embodiment of the invention.

The second embodiment of the invention will be described with reference to FIG. 3. In the second embodiment of the invention, components having the same functions as those described in the foregoing embodiment of the invention are denoted by the same reference symbols respectively to thereby avoid repeating the same description.

This embodiment of the invention is different from the foregoing first embodiment of the invention in that a vehicle system 1-2 autonomously determines that the own vehicle is a leading vehicle of a vehicle group or plays the role of a bottleneck. FIG. 3 is a view showing a traffic control system 2 of this embodiment of the invention. As shown in FIG. 3, the vehicle system 1-2 has a vehicle-to-vehicle distance measuring device 26 in addition to the devices belonging to the vehicle system 1-1 of the foregoing first embodiment of the invention. The vehicle-to-vehicle distance measuring device 26 can measure a vehicle-to-vehicle distance between the own vehicle and a vehicle running immediately in front of the own vehicle, and a relative vehicle speed between these vehicles. Further, the vehicle-to-vehicle distance measuring device 26 can measure a vehicle-to-vehicle distance between the own vehicle and a vehicle running immediately behind the own vehicle, and a relative vehicle speed between these vehicles. The vehicle-to-vehicle distance measuring device 26 can be composed of, for example, sensors mounted on front and rear portions of the vehicle respectively, such as laser radar sensors or millimeter wave radar sensors, or the like. Signals indicating the vehicle-to-vehicle distance and relative vehicle speed measured by the vehicle-to-vehicle distance measuring device 26 are output to a vehicle ECU 24.

The vehicle ECU 24 can determine, on the basis of, for example, vehicle-to-vehicle distances between the own vehicle and vehicles running in front of and behind the own vehicle, that the own vehicle is a leading vehicle of a vehicle group. Referring to FIG. 1, the vehicle ECU 24 of the leading vehicle 101 determines, on the basis of a vehicle-to-vehicle distance (hereinafter referred to as "a front vehicle-to-vehicle distance) Lf between the leading vehicle 101 and the vehicle 110 running immediately in front of the leading vehicle 101 and a vehicle-to-vehicle distance (hereinafter referred to as "a rear vehicle-to-vehicle distance) Lr between the leading vehicle 101 and the vehicle 102 running immediately behind the leading vehicle 101, that the own vehicle is the leading vehicle of the vehicle group 100. When the front vehicle-to-vehicle distance Lf is larger than the rear vehicle-to-vehicle distance Lr, it is possible to determine that the own vehicle is the leading vehicle 101 of the vehicle group 100. In addition, when the vehicle-to-vehicle value between the own vehicle and the vehicle running immediately in front of the own vehicle is large, the vehicle ECU 24 may determine that the own vehicle is the leading vehicle 101 of the vehicle group 100. Further, it may be determined not on the basis of the vehicle-to-vehicle distance but on the basis of the vehicle-to-vehicle time interval that the own vehicle is the leading vehicle 101 of the vehicle group 100.

Furthermore, the vehicle ECU 24 can determine whether or not the own vehicle is a bottleneck. For example, a case where the own vehicle passes a sag will be described as an example. When at least one of a condition (a first condition) that the front vehicle-to-vehicle distance Lf be larger than the rear vehicle-to-vehicle distance Lr, a condition (a second condition) that the average speed of the own vehicle be lower than the segmental average speed of vehicles running on the road 50, and a condition (a third condition) that the degree of the fall in speed after the passage of a sag point be equal to or higher than a predetermined degree is fulfilled, the vehicle ECU 24 determines that the own vehicle is a bottleneck. The segmental average speed is based on, for example, passing speeds of the respective vehicles, which are measured by the traffic volume measuring device 11. The segmental average speed is transmitted from the infrastructure system 2-1 to the vehicle system 1-2 through road-to-vehicle communication. It should be noted that the segmental average speed may be based on a detection result of the speeds of vehicles running around the own vehicle instead of being based on values acquired from the infrastructure system 2-1. Further, the degree of the fall in speed is, for example, an amount of the fall in the speed of the own vehicle or a falling speed of the speed of the own vehicle.

The vehicle ECU 24 provides the driver with information via the HMI device 25 when it is determined that the own vehicle is the leading vehicle 101 of the vehicle group 100 or that the own vehicle is a bottleneck. Further, it may be determined whether to provide information or not, or the contents of the provided information may be changed in accordance with the degree to which the own vehicle blocks the flow of vehicles as a bottleneck. For example, it is possible to determine that the degree of blocking the flow of vehicles increases as the number of the fulfilled conditions among the aforementioned first to third conditions increases. Further, the aforementioned first to third conditions may be weighted respectively in determining the degree of blocking the flow of vehicles. The contents of the information with which the driver is provided can be made the same as, for example, those of the information provided in the foregoing first embodiment of the invention.

The vehicle system 1-2 of this embodiment of the invention can function alone as the traffic control system 2, with the infrastructure system 2-1 omitted.

It should be noted that the method of determining whether or not the own vehicle is a bottleneck is not limited to those mentioned in the aforementioned first to third conditions. For example, the degree to which the own vehicle blocks the flow of vehicles may be estimated on the basis of the difference in speed between the own vehicle and another vehicle approaching the own vehicle from behind.

Figure 4:
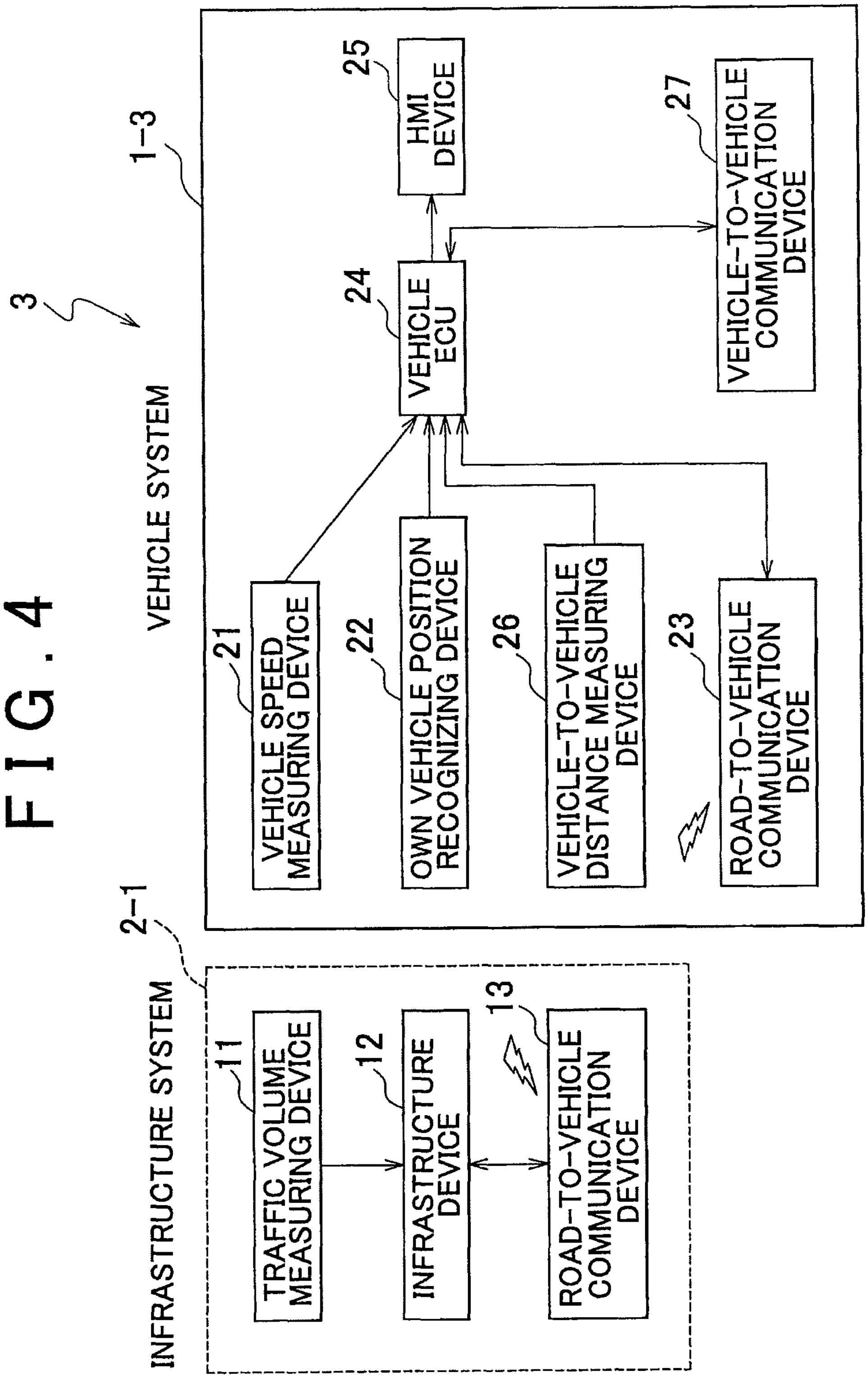
FIG. 4 is a view showing a traffic control system of the third embodiment of the invention.
Figure 5:
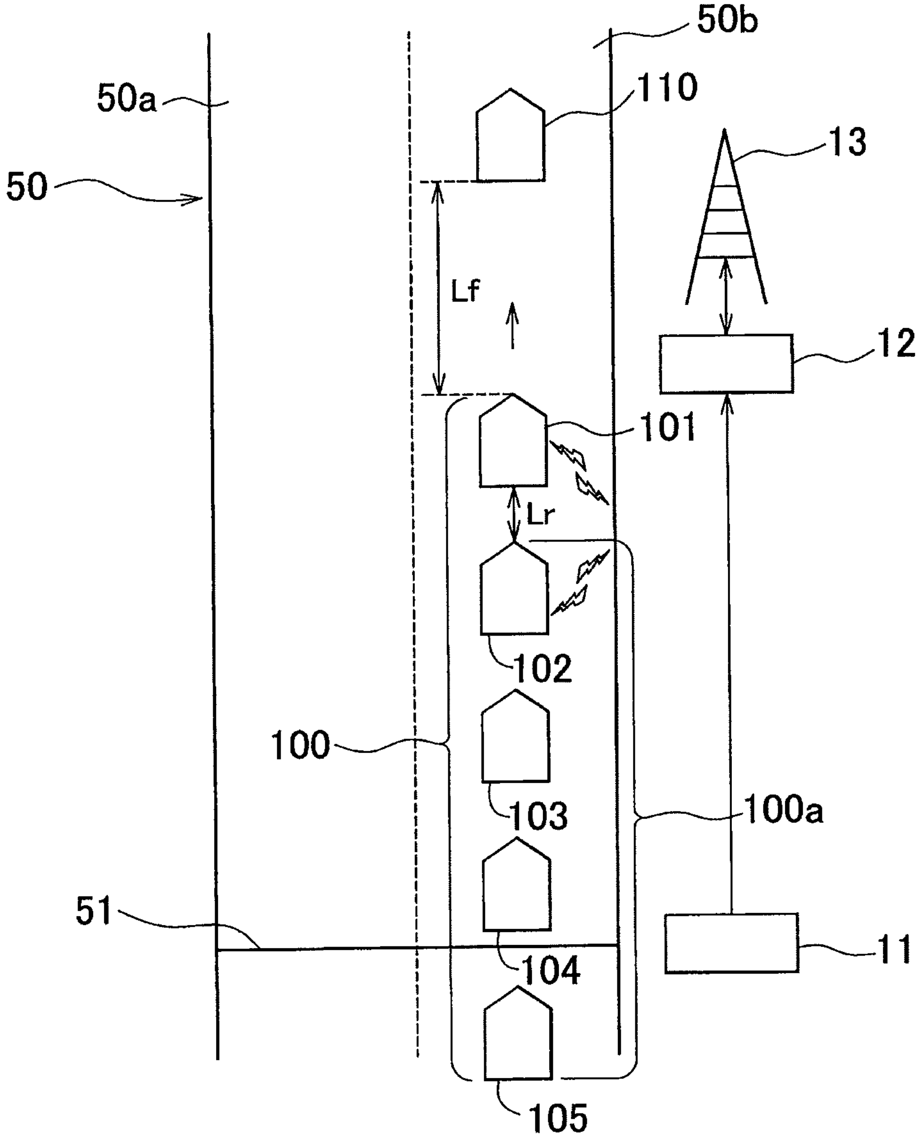
FIG. 5 is a view for explaining traffic control of the third embodiment of the invention.

The third embodiment of the invention will be described with reference to FIGS. 4 and 5. In the third embodiment of the invention, components having the same functions as those described in the foregoing respective embodiments of the invention are denoted by the same reference symbols respectively to thereby avoid repeating the same description.

This embodiment of the invention is different from the foregoing respective embodiments of the invention in that the leading vehicle 101 of the vehicle group 100 is directly or indirectly provided with information from the following vehicles 100*a*. FIG. 4 is a view showing a traffic control system 3 of this embodiment of the invention. FIG. 5 is a view for explaining traffic control of this embodiment of the invention. As shown in FIG. 4, a vehicle system 1-3 has a vehicle-to-vehicle communication device 27 in addition to the devices belonging to the vehicle system 1-2 of the foregoing second embodiment of the invention. The vehicle-to-vehicle communication device 27 is a communication device that establishes bidirectional communication among vehicles each mounted with the vehicle-to-vehicle communication device 27.

In vehicle-to-vehicle communication, various pieces of information including identification information, running information, target control amount information, driver operation information, vehicle specification information, communication standard information, and environment information can be transmitted toward other vehicles. The identification information includes an ID of a transmission source vehicle and an ID of a vehicle group to which the transmission source vehicle belongs. The running information is measurement value information on the running of the own vehicle, such as a current position, a traveling direction (a bearing), a running speed, a running acceleration, a jerk, a vehicle-to-vehicle distance, a vehicle-to-vehicle time interval, and the like. The target control amount information is composed of target values, input values, control command values and the like at the time when an on-vehicle instrument controls the vehicle, and includes a target speed, a target acceleration, a target jerk, a target direction (a target bearing), a target vehicle-to-vehicle time interval, and a target vehicle-to-vehicle distance.

The driver operation information is information on inputs or amounts of input operation by the driver, and includes an accelerator operation amount, a brake operation amount (a depression force and a stroke), indicator operation (the presence or absence of operation and the direction of operation), a steering angle, an ON/OFF state of a brake lamp, and the like. The vehicle specification information includes a vehicle weight, a maximum braking force, a maximum acceleration force, a maximum jerk, and reaction speeds and time constants of respective actuators (a brake, an accelerator, a shifter and the like). The communication standard information is based on a rule determined in advance, and includes flags indicating greeting information and transfer information, and the like. The environment information is information on a running environment, and includes road surface information (e.g., μ, a gradient, a temperature, a wet/dry/frozen state, a paved/unpaved state), information on a wind speed and a wind direction, and the like.

It should be noted herein that a case where the vehicle system 1-3 is mounted on each of the leading vehicle 101 and the vehicle 102 running immediately behind the leading vehicle 101 in the vehicle group 100 shown in FIG. 5 will be described as an example. The vehicle 102 transmits to the leading vehicle 101 through vehicle-to-vehicle communication the fact that the leading vehicle 101 is a bottleneck or that the driver operation of suppressing the growth of the vehicle group 100 is desired.

It can be determined that the leading vehicle 101 is a bottleneck, for example, when a condition that the running speed of the leading vehicle 101 be lower than the segmental average speed on the road 50, a condition that the running speed of the leading vehicle 101 be falling, or the like is fulfilled. Further, it may be determined that the leading vehicle 101 is a bottleneck, when a condition that the running speed of the leading vehicle 101 be lower than a target speed of the vehicle 102, for example, a target speed of cruise control is fulfilled.

When a condition making it possible to determine that the leading vehicle 101 is a bottleneck is fulfilled, the vehicle ECU 24 of the vehicle 102 transmits to the leading vehicle 101 the information indicating at least either that the leading vehicle 101 is a bottleneck or that the driving operation of suppressing the growth of the vehicle group 100 is desired. The vehicle ECU 24 of the leading vehicle 101, which has received this information from the vehicle 102, provides the driver of the own vehicle with information through the HMI device 25. It should be noted that the vehicle ECU 24 of the vehicle 102 may calculate the degree to which the leading vehicle 101 blocks the flow of vehicles, and may request the leading vehicle 101 to provide the driver with information when this degree is high.

When the driver provided with information performs the operation of accelerating the leading vehicle 101 or changing lanes, the growth of the vehicle group 100 is suppressed. Further, an effect of the elimination of the vehicle group 100 such as the separation of the vehicle group 100 or the like can be expected.

It should be noted that when the front vehicle-to-vehicle distance Lf of the leading vehicle 101 is transmitted from the leading vehicle 101 to the vehicle 102 through vehicle-to-vehicle communication, the vehicle 102 can determine whether or not the leading vehicle 101 runs at the head of the vehicle group 100.

In this embodiment of the invention, the driver of the leading vehicle 101 is provided with information from the vehicle 102 through vehicle-to-vehicle communication. Instead, however, the driver of the leading vehicle 101 may be provided with information from the vehicle 102 via the infrastructure system 2-1.

The fourth embodiment of the invention will be described. In the fourth embodiment of the invention, components having the same functions as those described in the foregoing respective embodiments of the invention are denoted by the same reference symbols respectively to thereby avoid repeating the same description.

This embodiment of the invention is different from the foregoing respective embodiments of the invention in that a vehicle that is not currently a leading vehicle of a vehicle group but is estimated to become a leading vehicle of a vehicle group over time is provided with information. Traffic control of this embodiment of the invention can be performed in, for example, the traffic control system 1 of the foregoing first embodiment of the invention.

The infrastructure device 12 provides a driver of a vehicle (hereinafter referred to as "a predetermined vehicle"), which runs at a low speed among vehicles running on the road 50, with information. The information transmitted herein concerns at least one of predictable formation of a vehicle group with the predetermined vehicle at the head and a driving operation of restraining a vehicle group from being formed with the predetermined vehicle at the head.

The infrastructure device 12 defines as the predetermined vehicle, for example, a vehicle running at a speed lower than a predetermined speed set in advance. A predetermined running state in this embodiment of the invention means running at a speed lower than the predetermined speed. The predetermined speed can be, for example, a segmental average speed on each of the lanes. This is because a vehicle running at a speed lower than the segmental average speed can be estimated to be caught up with by another vehicle over time and become a leading vehicle of a vehicle group. It should be noted that the predetermined speed may be a running speed of a vehicle running from behind on the same lane. For example, when the running speed of a vehicle that has already passed the measurement spot 51 is lower than the running speed of a vehicle that has passed the measurement spot 51 afterward, the vehicle that has first passed the measurement spot 51 can be defined as the predetermined vehicle. Further, the predetermined speed may be a running speed of a vehicle group running from behind on the same lane. The running speed of the vehicle group may be represented by the running speed of the leading vehicle of the vehicle group. When a vehicle group catches up with a vehicle running at a low speed from behind, the propagation of deceleration or a deceleration shock wave tends to occur in the vehicle group due to the deceleration of a leading vehicle. Thus, it is effective from the standpoint of suppressing the occurrence of traffic congestion to notify a driver of the predetermined vehicle of the approach of the vehicle group or to urge the driver of the predetermined vehicle to perform the operation of acceleration or lane change.

When the driver of the predetermined vehicle, who is provided with information, performs the operation of acceleration or lane change, the vehicle group is thereby restrained from being formed with the predetermined vehicle at the head. Further, traffic congestion, or the like, which arises when the vehicle group catches up with the predetermined vehicle from behind, is restrained. In consequence, according to this embodiment of the invention, there is an advantage in that the occurrence of a vehicle group, traffic congestion or the like is suppressed beforehand.

Figure 6:
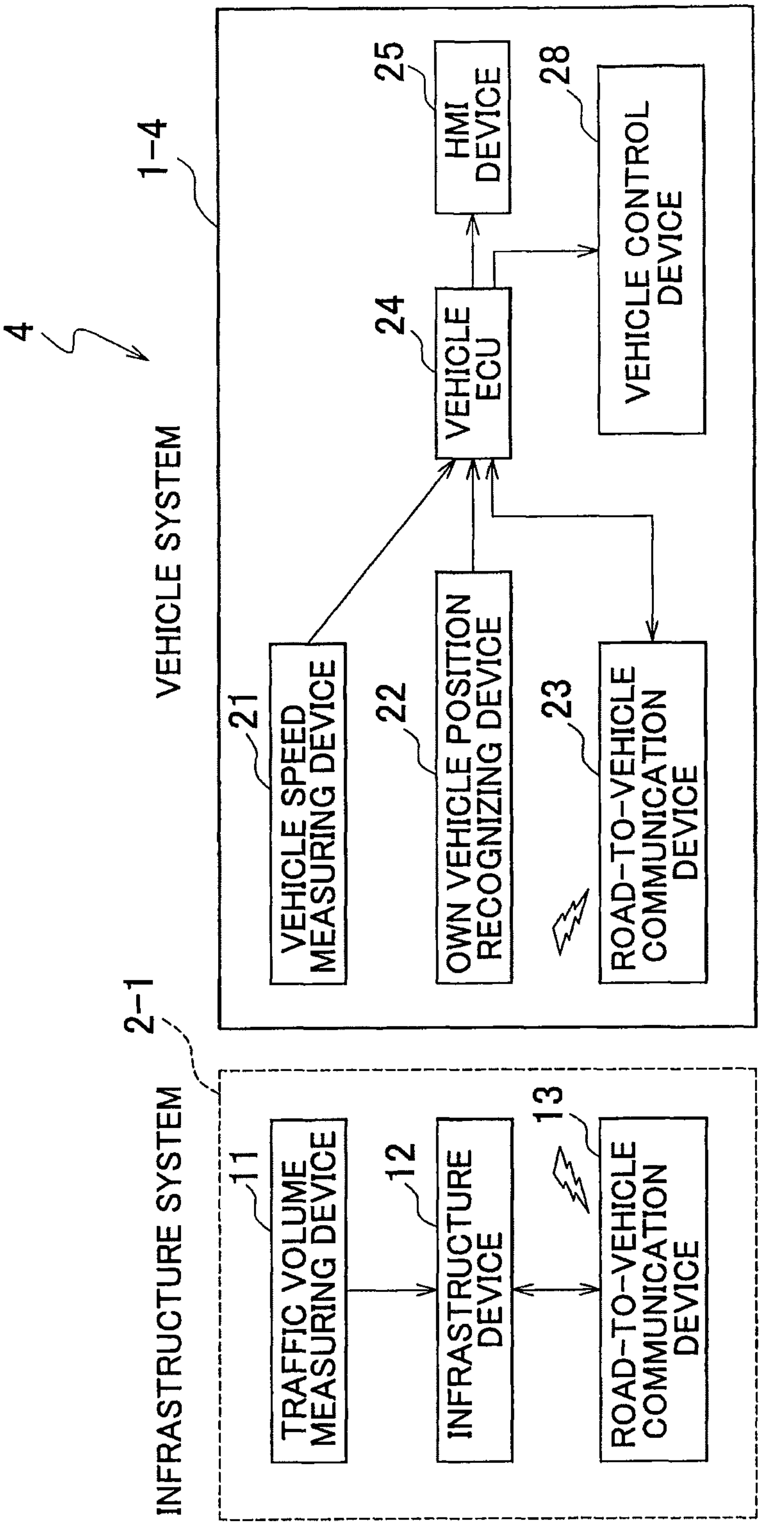
FIG. 6 is a view showing a traffic control system of the fifth embodiment of the invention.

The fifth embodiment of the invention will be described with reference to FIG. 6. In the fifth embodiment of the invention, components having the same functions as those described in the foregoing respective embodiments of the invention are denoted by the same reference symbols respectively to thereby avoid repeating the same description.

This embodiment of the invention is different from the foregoing respective embodiments of the invention in that running control of the own vehicle is performed to suppress the growth of a vehicle group by a vehicle system 1-4 when a leading vehicle is provided with information from the infrastructure device 12 or the like. FIG. 6 is a view showing a traffic control system 4 of this embodiment of the invention. As shown in FIG. 6, the vehicle system 1-4 has a vehicle control device 28 in addition to the devices belonging to the vehicle system 1-1 of the foregoing first embodiment of the invention. The vehicle system 1-4 of this embodiment of the invention functions as a vehicle control system.

The vehicle control device 28 is a device that controls the running state of the vehicle, and controls an engine, a brake, an automatic transmission, a steering device, and the like. For example, in accelerating the own vehicle, the vehicle ECU 24 issues a command to the vehicle control device 28 using a target running speed or a target acceleration as a control target. Further, in causing the own vehicle to change lanes, the vehicle ECU 24 commands the vehicle control device 28 to make a change to a new lane. The vehicle control device 28 can accelerate the own vehicle or cause the own vehicle to change lanes in accordance with a command of the vehicle ECU 24.

Upon receiving from the infrastructure device 12 or the following vehicles 100*a* information indicating that the own vehicle is the leading vehicle of the vehicle group 100, information indicating that the own vehicle is a bottleneck, or information urging the operation of suppressing the growth of the vehicle group, the vehicle ECU 24 can command the vehicle control device 28 to accelerate the own vehicle or cause the own vehicle to change lanes. It should be noted herein that the running control of the vehicle based on the received information may be performed only when the driver grants permission. The vehicle ECU 24 performs the running control for acceleration or lane change on the basis of the received information, for example, when cruise control such as ACC or the like is performed and the driver grants permission to the running control of suppressing the growth of the vehicle group.

Acceleration or lane change may be selected, for example, by the driver or according to a predetermined method. In the case where the driver makes a selection, it is appropriate to allow the driver to set in advance which one of acceleration and lane change should be given higher priority, or to urge the driver to make a selection every time the control is started. Further, as the method in which the vehicle ECU 24 selects acceleration or lane change, it is possible to mention, for example, a method of making a selection on the basis of the traffic volume on each of the lanes. For example, when the traffic volume on an own lane is larger than the traffic volume on an adjacent lane, it is appropriate to select a lane change to the adjacent lane.

The vehicle ECU 24 may make the target value of running control variable in accordance with the degree to which the own vehicle blocks the flow of vehicles as a bottleneck. For example, it is appropriate to set the target speed higher or make a lane change to a lane spaced further apart from an overtaking lane when the degree of blocking the flow of vehicles is high than when the degree of blocking the flow of vehicles is low. The vehicle ECU 24 may acquire a value calculated by the infrastructure device 12 as the degree of blocking the flow of vehicles, or may calculate the degree of blocking the flow of vehicles by itself. For example, when the vehicle ECU 24 autonomously determines that the own vehicle is the leading vehicle of the vehicle group or that the own vehicle is a bottleneck as in the case of the foregoing second embodiment of the invention, it is possible to determine that the degree of blocking the flow of vehicles increases as the number of fulfilled conditions among the aforementioned first to third conditions increases.

From the standpoint of reducing the degree of interference by control, vehicle control may be performed to suppress the growth of the vehicle group only when the degree to which the own vehicle blocks the flow of vehicles as a bottleneck is high. For example, it is appropriate to simply provide the driver with information through the HMI device 25 when the degree to which the own vehicle blocks the flow of vehicles is low, and to allow the vehicle control device 28 to perform vehicle control when the degree to which the own vehicle blocks the flow of vehicles is high.

According to this embodiment of the invention, the vehicle control device 28 performs running control to suppress the growth of the vehicle group, so that the growth of the vehicle group is more reliably suppressed. Further, when the infrastructure device 12 commands the leading vehicle of the vehicle group to follow an optimal running state (a lane on which the leading vehicle should run and a target running speed) in accordance with a traffic situation, the flow of vehicles on the road 50 can be controlled.

It should be noted that when the vehicle system 1-4 autonomously determines whether or not the own vehicle is the leading vehicle of the vehicle group, it becomes possible for the vehicle system 1-4 at least either to suppress the occurrence of traffic congestion or to relieve traffic congestion by itself.

The contents disclosed in the foregoing respective embodiments of the invention can be carried out after being appropriately combined with one another.

As described above, the traffic control system according to the invention and the vehicle control system according to the invention are suited to the suppression of the occurrence of traffic congestion and the relief of traffic congestion.

While the disclosure has been explained in conjunction with the specific exemplary embodiments thereof, it is evident that many alternatives, modifications, and variations will be apparent to those skilled in the art. Accordingly, the exemplary embodiments of the disclosure as set forth herein are intended to be illustrative, not limiting. There are changes that may be made without departing from the scope of the disclosure.

What is claimed is:

1. A traffic control system characterized by providing a driver of a vehicle, which runs in a predetermined running state among vehicles running on a road having multiple lanes, with information on suppression of traffic congestion on the road, wherein the predetermined running state is running at a head of a vehicle group that includes a plurality of vehicles driving in the same lane, and the information is provided by providing a driver of a leading vehicle running at the head of the vehicle group with information on at least one of formation of the vehicle group with the leading vehicle at the head and driving operation of suppressing a growth of vehicles of the vehicle group located behind the lead vehicle, wherein the traffic control system is configured to provide the driver with the information on a basis of at least one of a running speed of the leading vehicle, a vehicle-to-vehicle value between the leading vehicle and a vehicle running immediately in front of the leading vehicle, and a number of vehicles included in the vehicle group, wherein the vehicle-to-vehicle value is a value concerning a relationship between the leading vehicle and the vehicle running immediately in front of the leading, the traffic control system being configured to urge the driver of the leading vehicle to perform a driving operation of at least one of acceleration and lane change in providing the driver with the information, and wherein a content of the driving operation that the driver is urged to perform is changed on a basis of a traffic volume on each of the lanes.

2. The traffic control system according to claim 1, wherein the predetermined running state is a running state constituting a cause of traffic congestion on the road.

3. The traffic control system according to claim 1, which more strongly urges the driver of the leading vehicle to perform the driving operation when the running speed of the leading vehicle is low than when the running speed of the leading vehicle is high.

4. The traffic control system according to claim 3, which more strongly urges the driver of the leading vehicle to perform a driving operation when the number of the vehicles included in the vehicle group is large than when the number of the vehicles included in the vehicle group is small.

5. The traffic control system according to claim 1, which more strongly urges the driver of the leading vehicle to perform the driving operation when the vehicle-to-vehicle value between the leading vehicle and the vehicle running immediately in front of the leading vehicle is large than when the vehicle-to-vehicle value between the leading vehicle and the vehicle running immediately in front of the leading vehicle is small.

6. The traffic control system according to claim 1, which the traffic control system provides the driver with the information when the vehicle is in at least one of a range of a running environment tending to cause a fall in running speed on the road and a range before the range of the running environment.

7. The traffic control system according to claim 1, wherein the vehicle-to-vehicle value is a vehicle-to-vehicle distance.

8. A traffic control system characterized by providing a driver of a vehicle, which runs in a predetermined running state among vehicles running on a road having multiple lanes, with information on suppression of traffic congestion on the road, wherein the predetermined running state is running at a speed lower than a predetermined speed set in advance, and the information is provided by providing a driver of a predetermined vehicle running at the speed lower than the predetermined speed with information on at least one of predictable formation of a vehicle group that includes a plurality of vehicles driving in the same lane with the predetermined vehicle at a head and a driving operation of suppressing growth of vehicles of the vehicle group located behind the lead vehicle and wherein a content of the driving operation that the driver is urged to perform is changed on a basis of a traffic volume on each of the lanes.

9. The traffic control system according to claim 8, which the traffic control system provides the driver with the information when the vehicle is in at least one of a range of a running environment tending to cause a fall in running speed on the road and a range before the range of the running environment.

10. The traffic control system according to claim 8, wherein the predetermined running state is a running state constituting a cause of traffic congestion on the road.

11. A vehicle control system for performing running control of a vehicle to suppress a growth of a vehicle group when the vehicle runs at a head of the vehicle group that includes a plurality of vehicles driving in the same lane on a road having multiple lanes, wherein a driver of a leading vehicle running at the head of the vehicle group is provided with information on at least one of formation of the vehicle group with the leading vehicle at the head and driving operation of suppressing a growth of vehicles of the vehicle group located behind the lead vehicle, wherein the traffic control system is configured to provide the driver with the information on a basis of at least one of a running speed of the leading vehicle, a vehicle-to-vehicle value between the leading vehicle and a vehicle running immediately in front of the leading vehicle, and a number of vehicles included in the vehicle group, wherein the vehicle-to-vehicle value is a value concerning a relationship between the leading vehicle and the vehicle running immediately in front of the leading vehicle, the vehicle control system being configured to urge the driver of the leading vehicle to perform a driving operation of at least one of acceleration and lane change in providing the driver with the information, and wherein a content of the driving operation that the driver is urged to perform is changed on a basis of a traffic volume on each of the lanes.

12. The traffic control system according to claim 11, wherein the vehicle-to-vehicle value is a vehicle-to-vehicle distance.

13. A traffic control method comprising:

detecting a vehicle running in a predetermined running state among vehicles running on a road having multiple lanes; and providing a driver of the detected vehicle running in the predetermined running state with information of suppression of traffic congestion on the road, wherein the information is provided by providing a driver of a leading vehicle running at the head of a vehicle group that includes a plurality of vehicles driving in the same lane with information on at least one of formation of the vehicle group with the leading vehicle at the head and a driving operation of suppression a growth of vehicles of the vehicle group located behind the lead vehicle, providing the driver with the information on a basis of at least one of a running speed of the leading vehicle, a vehicle-to-vehicle value between the leading vehicle and a vehicle running immediately in front of the leading vehicle, and a number of vehicles included in the vehicle group, wherein the vehicle-to-vehicle value is a value concerning a relationship between the leading vehicle and the vehicle running immediately in front of the leading vehicle, and urging the driver of the leading vehicle to perform a driving operation of at least one of acceleration and lane change in providing the driver with the information, and wherein a content of the driving operation that the driver is urged to perform is changed on a basis of a traffic volume on each of the lanes.

14. The traffic control system according to claim 13, wherein the vehicle-to-vehicle value is a vehicle-to-vehicle distance.

* * * * *

UNITED STATES PATENT AND TRADEMARK OFFICE

CERTIFICATE OF CORRECTION

PATENT NO. : 9,014,954 B2
APPLICATION NO. : 13/817435
DATED : April 21, 2015
INVENTOR(S) : K. Sato It is certified that error appears in the above-identified patent and that said Letters Patent is hereby corrected as shown below:

In the specification

At column 1, line 10, change "PCT/JP2011/001849" to -- PCT/IB2011/001849 --.

Signed and Sealed this
Twenty-fourth Day of November, 2015

Michelle K. Lee
*Director of the United States Patent and Trademark Office*